June 3, 1958     J. J. SKELLY     2,837,383
FASTENING DEVICE
Filed May 10, 1954

INVENTOR.
JAMES J. SKELLY
BY
ATTORNEYS

United States Patent Office 2,837,383
Patented June 3, 1958

2,837,383

FASTENING DEVICE

James J. Skelly, Lakewood, Ohio, assignor to Specialty Products Corporation, Cleveland, Ohio, a corporation of Ohio Application May 10, 1954, Serial No. 428,614

1 Claim. (Cl. 308—237)

This invention relates to clamps generally and more particularly to improvements in a quick-release fastening device for adjustably latching the clamp.

Various types of clamps are utilized for clamping and supporting an object, some of which take the form of flexible bands or straps for embracing an object. Many of these clamps are provided with fastening devices for latching the jaws of the clamp together to maintain the clamped relationship intact until manually or otherwise released. An adjustable quick-release type of clamp and latch is shown and described in my co-pending application entitled, Clamp, Serial No. 421,781, filed on April 8, 1954 and takes the form of a bandclamp carrying a draw bolt having a trunnion pivoted at one clamp jaw which coacts with a slotted guide block and an adjustable abutment type interlock at the other clamp jaw to removable fasten the clamp jaws together in any selected position. The latch is capable of being quickly released by removing the interlock and pivoting the draw bolt out of the guide block. The draw bolt trunnion is pivoted in a support which takes the form of a loop at the end of the band and added bearing surface is provided for the trunnions by mounting a bearing sleeve or collar on each of the trunnions.

It is a principal object of this invention to provide an improved trunnion bearing which may be readily assembled on the trunnions to provide the increased bearing surface.

It is a further object of this invention provide an improved method of assembling a bearing collar on a trunnion.

Briefly, in accordance with this invention there is provided an improved arrangement and method of assembly of a bearing collar in fixed relation on a trunnion by indenting the trunnion surface and then mounting the bearing collar on the trunnion and displacing a portion of its bearing surface into the indentation in the trunnion surface to secure the collar or sleeve against relative movement thereon.

Figure 7:
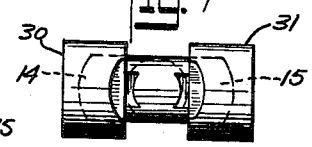
Figure 8:
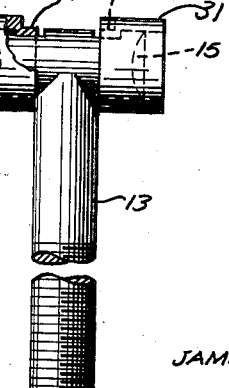

And, Figs. 7 and 8 are top and side views, the latter being partially in section, of the draw bolt illustrating its assembly with bearing collars.

Figure 1:
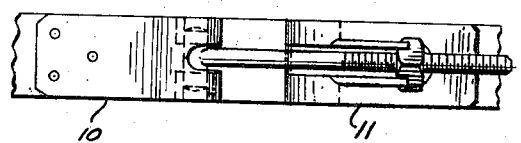
Fig. 1 is a top plan view of the free ends of a band clamp showing the latch device in latched position.
Figure 2:
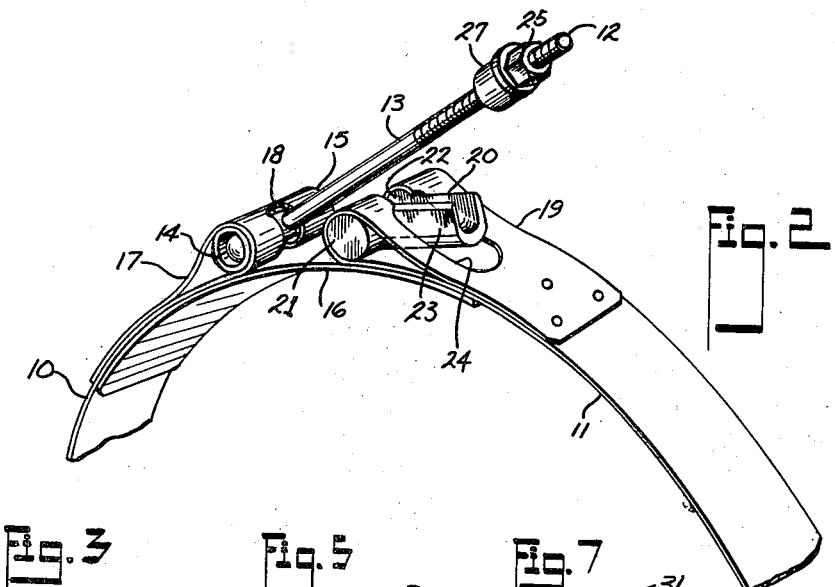
Fig. 2 is a perspective view of the portion of the clamp shown in Fig. 1 showing the manner in which the draw bolt is pivoted out of its guide block.

Referring now to Figs. 1 and 2 of the drawings, there is shown the free end portions or jaws 10 and 11 of a band clamp having an adjustable type of quick-release latch device. The latch takes the form of a draw bolt 12 having a threaded shank 13 with a T-shaped head forming trunnions 14 and 15 at one end. One free end 10 of the band clamp having an extended tongue portion 16 is provided with a fixed loop 17 which is longitudinally slotted at 18 in the top forward portion to pivotally support the draw bolt trunnions therein with the threaded shank 13 projecting outwardly to form a continuation of such end. The other free end 11 of the band clamp is also provided with a fixed loop 19 in which is pivotally seated the trunnion end of a draw bolt guide block 20. The guide block 20 has a T-shaped head forming trunnions 21 and 22 at one end and is provided with an axially slotted shank 23 that intersects and extends through the trunnion head. The loop 19 is also slotted longitudinally at 24 through its forward and top portions to permit the slotted shank 23 of the guide block to project through the loop 19 and rearwardly along the band from the extremity of the loop. The slot 24 is preferably irregular in shape and is narrower at the trunnion head than at the guide shank to engage and restrict pivotal movement of the guide shank 23 in a vertical direction from the band. Thus, when the band embraces an object, such as a conduit or the like, and the free ends are adjacent each other, the draw bolt 12 may be rotated about its trunnion pivot so that the shank 13 will be seated in the slotted guide shank 23.

The free ends of the band clamp 10 are restrained from separating by providing an adjustable abutment in the form of an internally threaded nut 25 on the draw bolt shank 13 which can be adjusted along the shank and positioned against the guide shank extremity so that, although the free ends of the band can be freely moved towards each other, they are restrained against separating movement away from each other. A suitable cup-shaped washer 27 or the like is mounted on the draw-bolt shank 13 intermediate the threaded nut 25 and the extremity of the guide shank so that when positioned towards the guide shank extremity its cupped end will encircle such extremity and lock the draw bolt 12 within the guide block 20 and restrain pivotal movement of the draw bolt out of the slotted guide shank 23. When it is desired to separate the clamp ends it is merely necessary to position them towards each other and pivot and the draw bolt 12 out of the slotted guide shank when the guide shank extremity is dis-engaged from the retaining cup-shaped washer 27, or, in the alternative, to withdraw the nut 25 along the draw bolt shank 13 to permit such pivotal movement of the draw bolt assembly.

Figure 3:
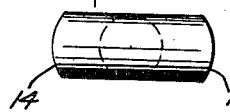
Figs. 3 and 4 are top and side views of the T-shaped draw bolt.
Figure 5:
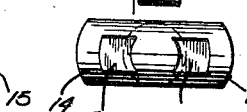
Figs. 5 and 6 are top and side views of the draw bolt after the external surfaces of the draw bolt trunnions have been indented.
Figure 4:
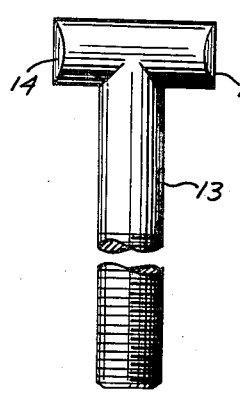
Figure 6:
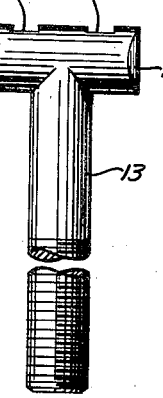

As shown in the drawings, the trunnion head of the draw bolt carries bearing collars 30 and 31 to provide a greater bearing surface for rotation within the looped end of the band. The bearing collars are in the form of cylindrical sleeves made of suitable bearing material and securely mounted on each trunnion. This is accomplished by providing the T-shaped draw bolt shown in Figs. 3 and 4 of the drawings with shallow indentations 32 and 33 in the external surfaces of the trunnion as shown in Figs. 5 and 6 of the drawings. A bearing collar is then mounted on each trunnion as shown in Figs. 7 and 8 of the drawings and the portions 34 and 35 of the bearing collars overlying the corresponding indentations in the trunnion surface are displaced into the indentation as best shown by the partial section in Fig. 8 to provide a secure interlocking fit between the bearing collar and the corresponding trunnion. The trunnion indentations and collar displacement may be made in any suitable manner as by a swaging tool or the like. Thus, the bearing collars may be readily assembled on the draw bolt trunnion head with a minimum of operations using standard bearing collars to provide a trunnion bearing for the draw bolt which will present a continuous bearing surface for rotation within the looped end of the band clamp.

I have shown and described what I consider to be the preferred embodiment of my invention along with other modified forms and suggestions, and it will be obvious to those skilled in the art that other modifications and changes may be made without departing from the scope of my invention as defined by the appended claim.

I claim:

A clamp draw-bolt comprising, a threaded shank having a T-shaped head at one end forming generally cylindrical trunnions for pivotally supporting the shank, each of said trunnions having a generally planar indentation in a segmental portion of its external surface and spaced axially inwardly from the corresponding free extremity of the trunnion, and an independent bearing sleeve encircling each trunnion, each sleeve having a generally planar segmental offset portion on its inner surface disposed into the indentation on the corresponding trunnion in surface-to-surface engaging relationship therewith to restrain relative movement therebetween.

References Cited in the file of this patent

UNITED STATES PATENTS

| | | |
|---|---|---|
| 1,739,528 | Skillman | Dec. 17, 1929 |
| 2,001,204 | Long et al. | May 14, 1935 |
| 2,395,745 | King | Feb. 26, 1946 |
| 2,426,423 | Woolsey | Apr. 26, 1947 |
| 2,741,498 | Elliott | Apr. 10, 1956 |